(12) United States Patent
Seki

(10) Patent No.: US 11,806,975 B2
(45) Date of Patent: Nov. 7, 2023

(54) DISPLAY APPARATUS

(71) Applicant: JOLED INC., Tokyo (JP)

(72) Inventor: Takahiro Seki, Tokyo (JP)

(73) Assignee: JOLED INC., Tokyo (JP)

( * ) Notice: Subject to any disclaimer, the term of this patent is extended or adjusted under 35 U.S.C. 154(b) by 0 days.

(21) Appl. No.: 17/811,156

(22) Filed: Jul. 7, 2022

(65) Prior Publication Data

US 2023/0010101 A1    Jan. 12, 2023

(30) Foreign Application Priority Data

Jul. 9, 2021    (JP) .................................. 2021-114400

(51) Int. Cl.
*B32B 3/02*    (2006.01)
*B32B 5/18*    (2006.01)
*B32B 7/022*    (2019.01)

(52) U.S. Cl.
CPC .................. *B32B 3/02* (2013.01); *B32B 5/18* (2013.01); *B32B 7/022* (2019.01); *B32B 2457/20* (2013.01)

(58) Field of Classification Search
None
See application file for complete search history.

(56) References Cited

U.S. PATENT DOCUMENTS

| | | | |
|---|---|---|---|
| 4,925,718 A | 5/1990 | Tsujimoto et al. | |
| 10,209,548 B2 | 2/2019 | Park et al. | |
| 2004/0183958 A1 | 9/2004 | Akiyama et al. | |
| 2006/0125973 A1 | 6/2006 | Akiyama et al. | |
| 2019/0064881 A1 | 2/2019 | Kim et al. | |
| 2020/0004296 A1 | 1/2020 | Lee et al. | |
| 2020/0008308 A1 | 1/2020 | Shin et al. | |
| 2020/0100371 A1 | 3/2020 | Choi | |
| 2021/0176873 A1 | 6/2021 | Shin et al. | |

FOREIGN PATENT DOCUMENTS

| | | |
|---|---|---|
| JP | H0222010 A | 1/1990 |
| JP | 2719379 B2 | 2/1998 |
| JP | 2004199643 A | 7/2004 |
| JP | 2004279867 A | 10/2004 |
| JP | 2012224059 A | 11/2012 |
| JP | 2019045855 A | 3/2019 |
| JP | 2020003794 A | 1/2020 |
| JP | 6698920 B2 | 5/2020 |

OTHER PUBLICATIONS

Office Action for JP Patent Application No. 2021-114400, dated May 16, 2023.

*Primary Examiner* — Alexander S Thomas
(74) *Attorney, Agent, or Firm* — CHIP LAW GROUP

(57) ABSTRACT

Provided is a display apparatus including a display panel that is capable of being rolled up, and a protection member, the protection member including a back surface portion layered closer to a back surface of the display panel, a first folded portion folded toward a front surface of the display panel from one end of the back surface portion in an orthogonal direction orthogonal to a roll-up direction in which the display panel is rolled up, and a second folded portion folded toward the front surface from another end of the back surface portion in the orthogonal direction. In the display apparatus, the first folded portion includes a first front surface portion arranged at one end of the front surface in the orthogonal direction, and the second folded portion includes a second front surface portion arranged at another end of the front surface in the orthogonal direction.

7 Claims, 6 Drawing Sheets

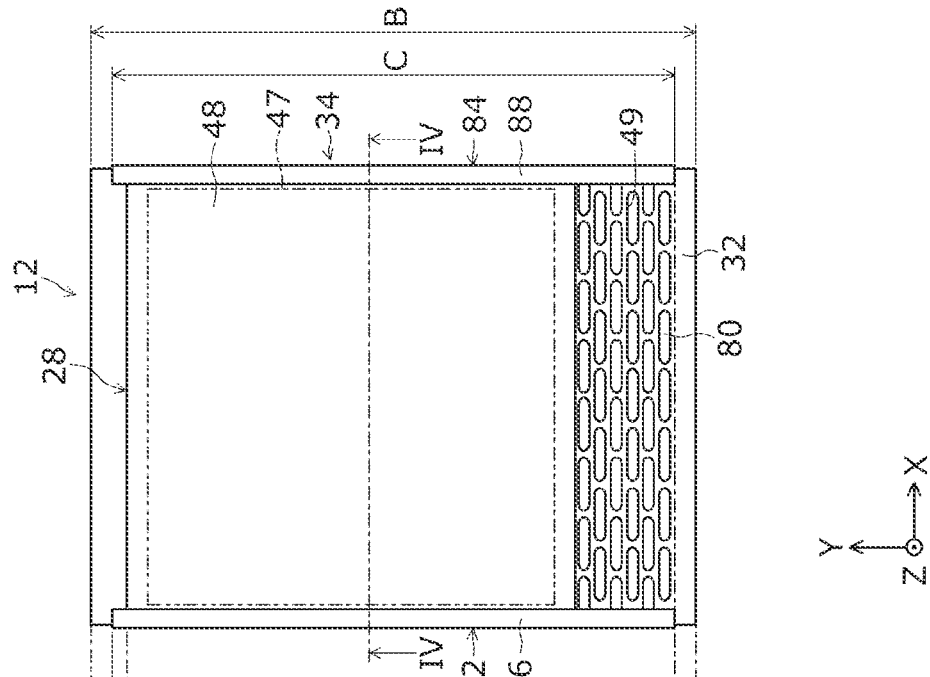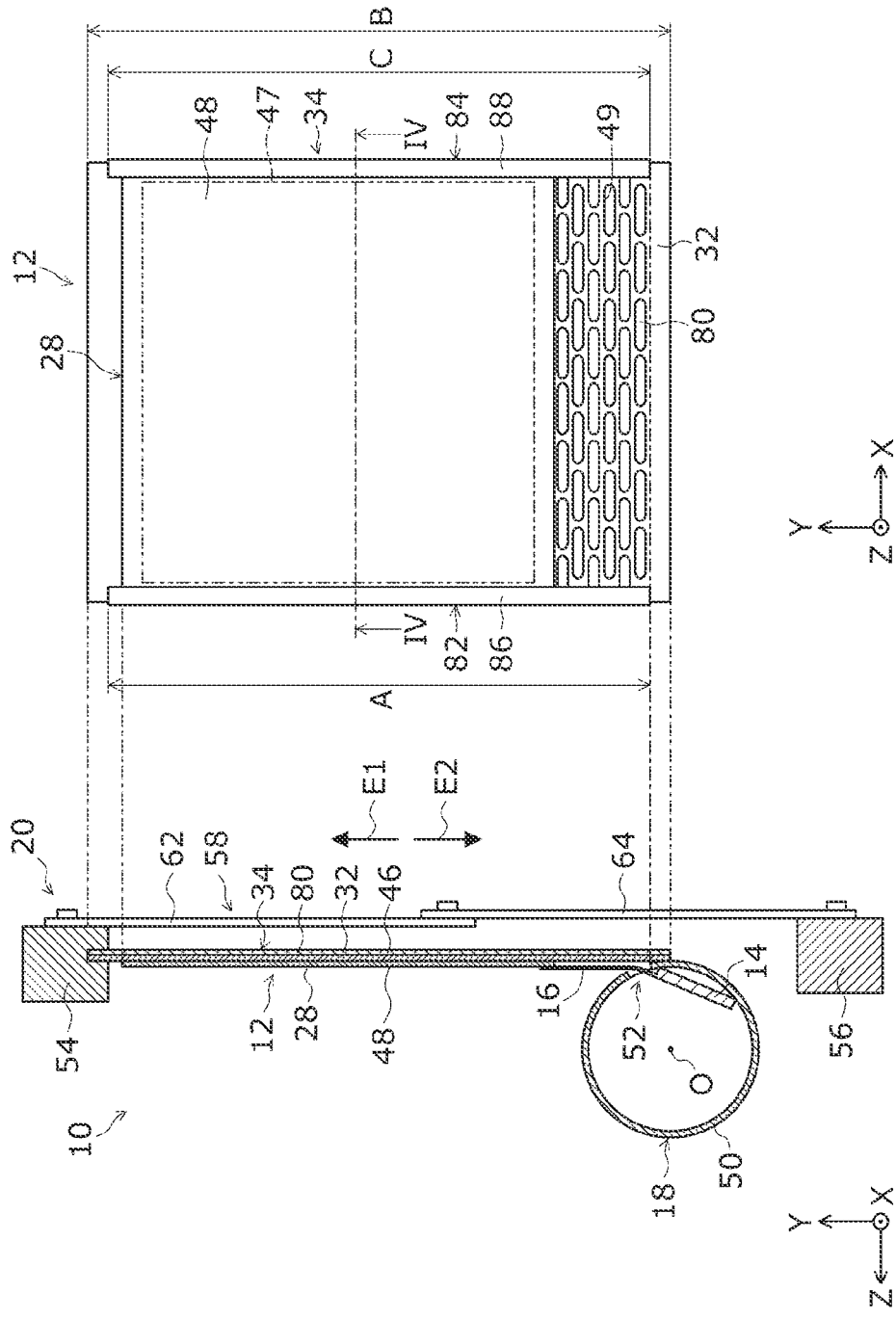

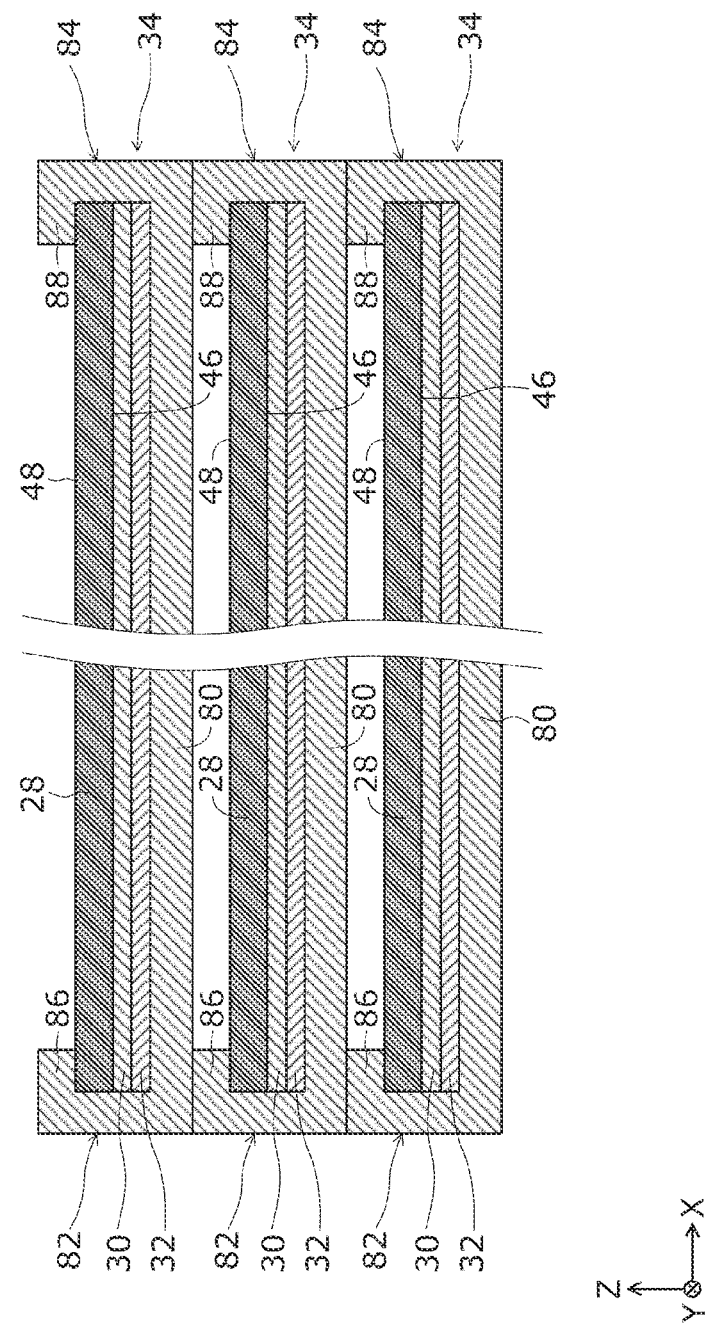

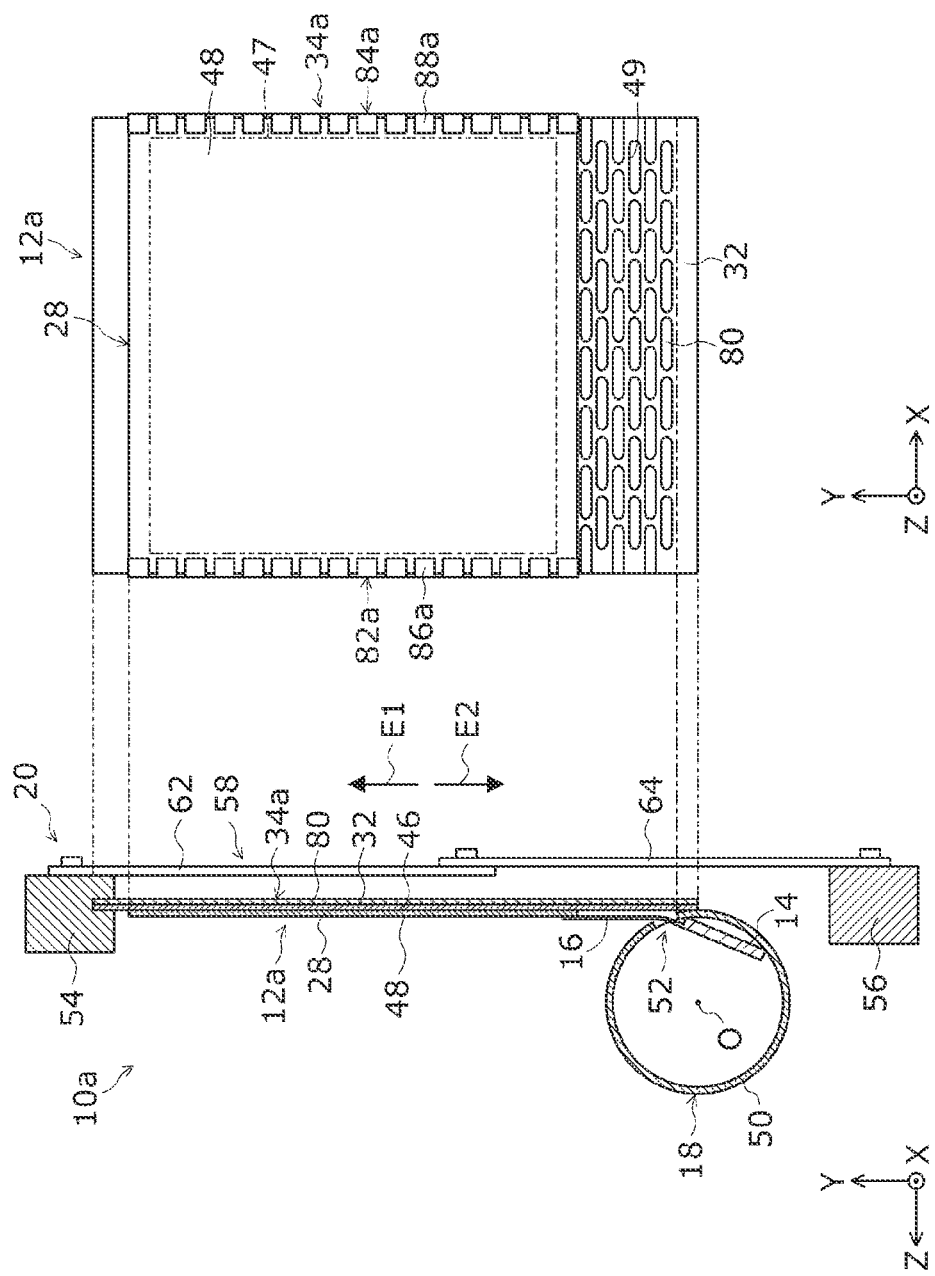

DISPLAY APPARATUS

CROSS REFERENCE TO RELATED APPLICATIONS

The present disclosure contains subject matter related to that disclosed in Japanese Priority Patent Application JP 2021-114400 filed in the Japan Patent Office on Jul. 9, 2021, the entire content of which is hereby incorporated by reference.

BACKGROUND

The present disclosure relates to a display apparatus, and particularly, to a display apparatus including a flexible display panel.

In the related art, a display apparatus including a flexible display panel is known. An example of this type of display apparatus includes a display apparatus including a display panel disclosed in Japanese Patent No. 6698920.

SUMMARY

However, the display apparatus of Japanese Patent No. 6698920 has such a problem that a front surface of the display panel comes into contact with a back cover or other members when the display panel is rolled up, thus damaging the display panel.

As such, it is desirable to provide a display apparatus that can prevent damage of a display panel.

An embodiment of the present disclosure provides a display apparatus including a display panel that is capable of being rolled up, and a protection member including a back surface portion layered closer to a back surface of the display panel, a first folded portion folded toward a front surface of the display panel from one end of the back surface portion in an orthogonal direction orthogonal to a roll-up direction in which the display panel is rolled up, and a second folded portion folded toward the front surface from another end of the back surface portion in the orthogonal direction. In the display apparatus, the first folded portion includes a first front surface portion arranged at one end of the front surface in the orthogonal direction, and the second folded portion includes a second front surface portion arranged at another end of the front surface in the orthogonal direction.

According to an embodiment of the present disclosure, a display apparatus that can prevent damage of a display panel can be provided.

BRIEF DESCRIPTION OF THE DRAWINGS

FIG. 2A and FIG. 2B depict a cross section of the display apparatus illustrated in FIG. 1 and a panel member;

FIG. 5 is a schematic cross-sectional view illustrating a state in which the panel member of the display apparatus illustrated in FIG. 1 is rolled up; and FIG. 6A and FIG. 6B depict a cross section of a display apparatus and a panel member according to a second embodiment.

DETAILED DESCRIPTION OF THE PREFERRED EMBODIMENTS

Figure 1A:
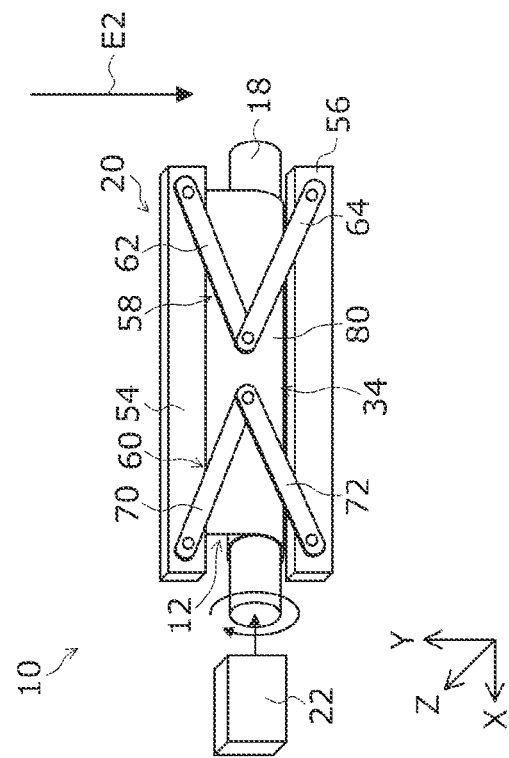
FIG. 1A and FIG. 1B are perspective views illustrating a display apparatus according to a first embodiment.

A display apparatus according to embodiments of the present disclosure will now be described with reference to the drawings. Note that each of the embodiments described below illustrates a specific example of the present disclosure. Hence, numerical values, constituent elements, and arrangement positions and connection modes of the constituent elements illustrated in the following embodiments are examples and are not intended to limit the present disclosure. Accordingly, constituent elements not described in the independent claims among the constituent elements in the following embodiments are described as optional constituent elements.

In the drawings, substantially the same constituent elements are provided with the same signs. The drawings are schematic diagrams and may not represent the exact ratios of the sizes of the components.

First Embodiment

Figure 1B:
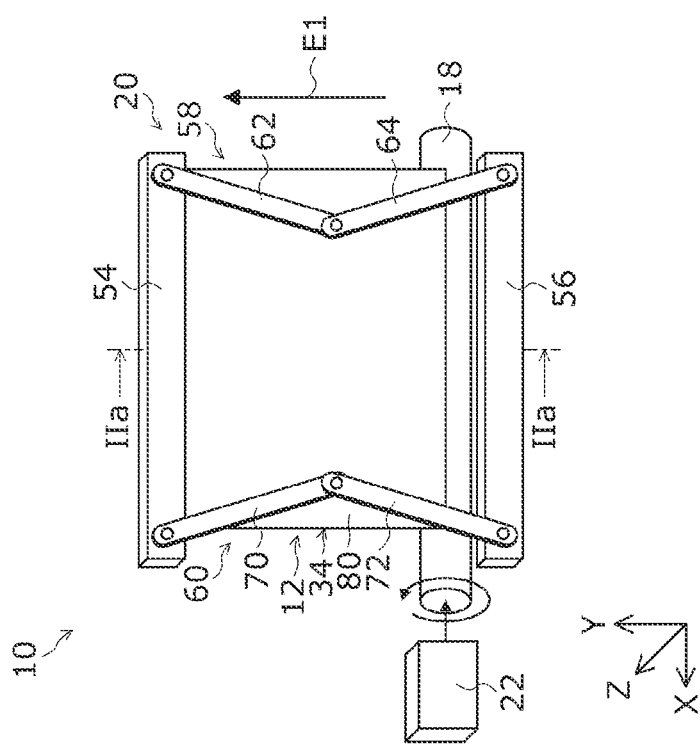
Figure 3:
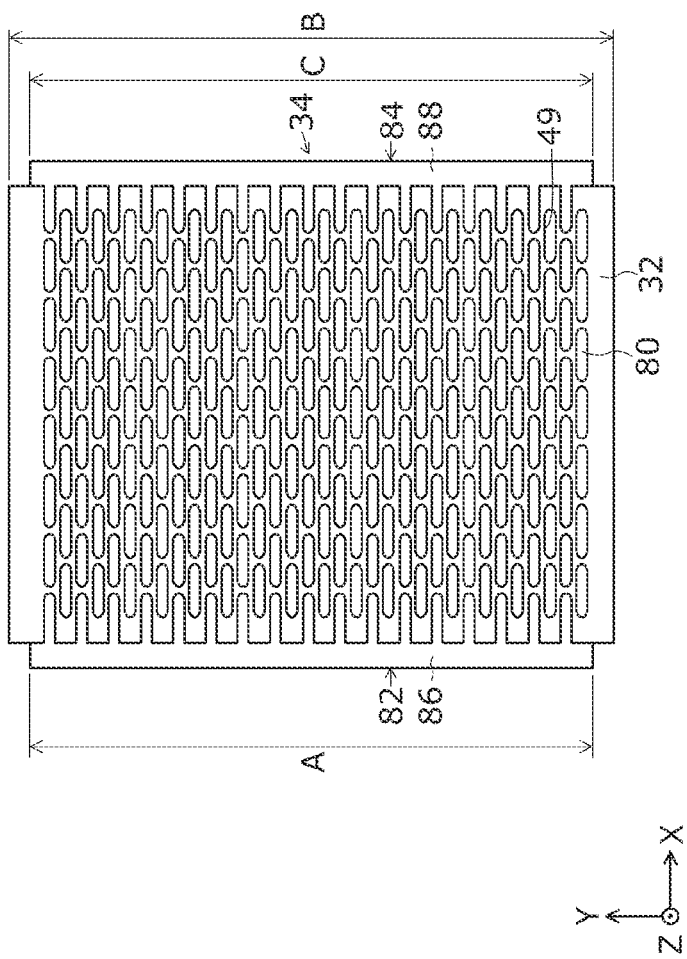
FIG. 3 depicts a reinforcing member of the display apparatus illustrated in FIG. 1 and a protection member that is yet to be folded.
Figure 4:
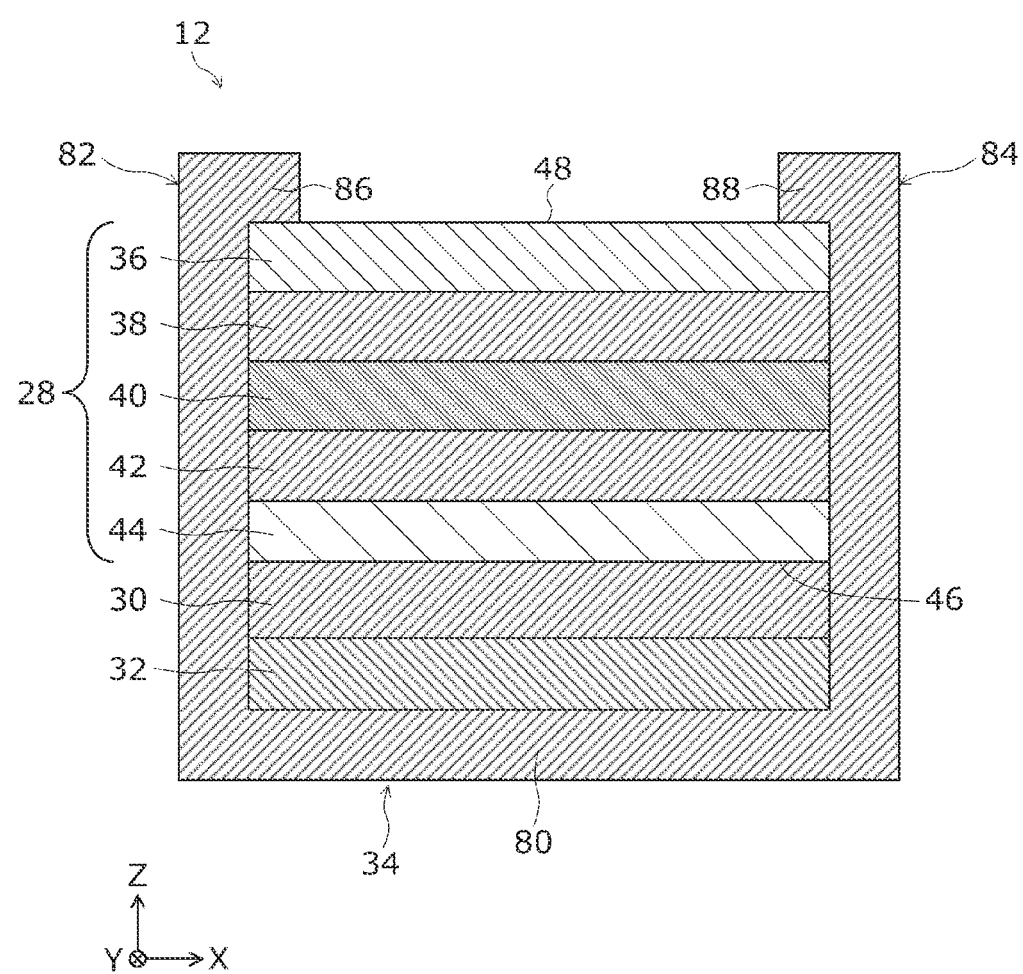
FIG. 4 is a schematic cross-sectional view illustrating the panel member of the display apparatus illustrated in FIG. 1.

FIG. 1A and FIG. 1B are perspective views illustrating a display apparatus 10 according to a first embodiment. FIG. 1A illustrates a state in which a panel member 12 is drawn out, and FIG. 1B illustrates a state in which the panel member 12 is rolled up. FIG. 2A and FIG. 2B depict a cross section of the display apparatus 10 illustrated in FIG. 1 and the panel member 12. FIG. 2A illustrates the cross section of the display apparatus 10, and FIG. 2B illustrates the panel member 12. A cross section taken along line IIa-IIa in FIG. 1A is illustrated in FIG. 2A. FIG. 3 depicts a reinforcing member 32 of the display apparatus 10 illustrated in FIG. 1A and FIG. 1B and a protection member 34 that is yet to be folded. FIG. 4 is a schematic cross-sectional view illustrating the panel member 12 of the display apparatus 10 illustrated in FIG. 1A and FIG. 1B. A schematic cross section taken along a line IV-IV in FIG. 2B is illustrated in FIG. 4. Note that in order to prevent complicated drawings, a first folded portion 82, an optical adhesive sheet 30, a plurality of through holes 49, and other members are not illustrated in FIG. 2A. The same applies to FIG. 6A.

As illustrated in FIGS. 1A to 4, the display apparatus 10 is an apparatus that displays an image, for example, and the display apparatus 10 includes the panel member 12, a drive board 14, a flexible board 16, a core member 18, a pantograph portion 20, and a motor 22. The display apparatus 10 is a rollable display apparatus that can roll up the panel member 12 and draw out the rolled panel member 12. The display apparatus 10 is used for, for example, a tablet terminal, a digital television, digital signage, a smartphone, or a wearable terminal.

The panel member 12 is flexible and can be rolled up. The panel member 12 is a plate-shaped member extending in a first direction and a second direction orthogonal to the first direction when being drawn out. The first direction is a direction indicated by an X-axis in FIGS. 1A to 6B, and the second direction is a direction indicated by a Y-axis in FIGS. 1A to 6B. The panel member 12 includes a display panel 28, the optical adhesive sheet 30, the reinforcing member 32, and the protection member 34.

The display panel 28 is a panel that displays an image, for example. The display panel 28 is flexible. The display panel 28 is what is generally called a flexible display panel. The display panel 28 can be rolled up along with the optical adhesive sheet 30, the reinforcing member 32, and the protection member 34. The display panel 28 is a plate-shaped member extending in the first direction and the second direction when the panel member 12 is drawn out. In the embodiment, the display panel 28 has a rectangular shape with the first direction as the long-side direction and the second direction as the short-side direction and has a plate shape in which a third direction orthogonal to the first direction and orthogonal to the second direction is a thickness direction, when the panel member 12 is drawn out. The display panel 28 displays an image toward one side in the third direction (positive side in Z-axis direction). The third direction is a direction indicated by a Z-axis in FIGS. 1A to 6B.

Note that the display panel 28 may have a rectangular shape with the first direction as the short-side direction and the second direction as the long-side direction or may have a square shape, other polygonal shapes, a circular shape, or an elliptical shape when the panel member 12 is drawn out.

The display panel 28 includes a cover window 36, an optical adhesive sheet 38, a circularly polarizing plate 40, an optical adhesive sheet 42, and an organic light emitting diode (OLED) panel 44.

The cover window 36, the optical adhesive sheet 38, the circularly polarizing plate 40, the optical adhesive sheet 42, and the OLED panel 44 are layered in this order in the thickness direction of the display panel 28. The thickness direction of the display panel 28 coincides with the thickness direction of the optical adhesive sheet 30, the thickness direction of the reinforcing member 32, and the thickness direction of a back surface portion 80 of the protection member 34.

The cover window 36 is bonded to the circularly polarizing plate 40 through the optical adhesive sheet 38, and the circularly polarizing plate 40 is bonded to the OLED panel 44 through the optical adhesive sheet 42. The OLED panel 44 includes, for example, layers of thin film transistor (TFT), OLED including organic electroluminescence (EL) elements, and thin film encapsulation (TFE).

The optical adhesive sheet 30 is pasted to a back surface 46 of the display panel 28 and layered on the display panel 28. In the embodiment, the optical adhesive sheet 30 is pasted to the entire back surface 46 of the display panel 28. In the embodiment, the back surface 46 is a back surface of the OLED panel 44. Examples of an adhesive that can be used for the optical adhesive sheet 30 include acrylic, silicone, epoxy, and rubber adhesives.

The rigidity of the reinforcing member 32 is higher than the rigidity of the display panel 28, and the reinforcing member 32 is a member that maintains the flatness of the display panel 28 when the panel member 12 is drawn out. The reinforcing member 32 is arranged between the display panel 28 and the back surface portion 80 of the protection member 34. The reinforcing member 32 is formed from, for example, metal with a large elastic region, such as stainless steel (SUS).

The reinforcing member 32 is attached to the back surface 46 of the display panel 28. In the embodiment, the reinforcing member 32 is bonded to the back surface 46 of the display panel 28 through the optical adhesive sheet 30 and thereby attached to the back surface 46 of the display panel 28 through the optical adhesive sheet 30.

The reinforcing member 32 has a plate shape and is layered on the display panel 28. The reinforcing member 32 has a plate shape extending in the first direction and the second direction when the panel member 12 is drawn out. In the embodiment, the reinforcing member 32 has a rectangular shape with the first direction as the short-side direction and the second direction as the long-side direction and has a plate shape with the third direction as the thickness direction, when the panel member 12 is drawn out. The reinforcing member 32 overlaps with an image display region 47 of the display panel 28 as viewed from the third direction.

Note that the reinforcing member 32 may have, for example, a rectangular shape with the first direction as the long-side direction and the second direction as the short-side direction or may have a square shape, other polygonal shapes, a circular shape, or an elliptical shape, when the panel member 12 is drawn out.

The reinforcing member 32 protrudes forward with respect to the display panel 28 in a roll-up direction (see arrow E2 in FIGS. 1B and 2A) in which the panel member 12 is rolled up. The roll-up direction is a direction in which the panel member 12 moves when being rolled up to the core member 18. A front end of the reinforcing member 32 in the roll-up direction is fixed to a peripheral surface of the core member 18, and the reinforcing member 32 couples the display panel 28 and the core member 18. That is, the reinforcing member 32 links the display panel 28 and the core member 18 through the reinforcing member 32 to prevent the display panel 28 and the core member 18 from being separated from each other.

The reinforcing member 32 protrudes forward with respect to the display panel 28 in a draw-out direction (see arrow E1 in FIGS. 1A and 2A) in which the panel member 12 is drawn out. The draw-out direction is a direction in which the panel member 12 moves when being drawn out from the core member 18, and the draw-out direction is a direction opposite the roll-up direction. The front end of the reinforcing member 32 in the draw-out direction is fixed to a first attachment member 54 of the pantograph portion 20.

The plurality of through holes 49 are formed on the reinforcing member 32. The plurality of through holes 49 are arranged in a staggered pattern. Some of the plurality of through holes 49 overlap with the image display region 47 as viewed from the third direction when the panel member 12 is drawn out. Each of the plurality of through holes 49 penetrates the reinforcing member 32 in the thickness direction of the reinforcing member 32 and has an oval shape. The plurality of through holes 49 are formed by, for example, wet etching.

Note that the plurality of through holes 49 may not be formed on the reinforcing member 32, and a plurality of recessed portions may be formed instead of the plurality of through holes 49, for example.

The protection member 34 is a member that prevents damage of the display panel 28 in rolling up the display panel 28. The protection member 34 includes the back surface portion 80, the first folded portion 82, and a second folded portion 84.

The back surface portion 80 is layered closer to the back surface 46 of the display panel 28. In the embodiment, the optical adhesive sheet 30 and the reinforcing member 32 are arranged between the back surface portion 80 and the display panel 28, and the back surface portion 80 is layered on the display panel 28 across the optical adhesive sheet 30 and the reinforcing member 32.

The back surface portion 80 is attached to a back surface of the reinforcing member 32. In the embodiment, the protection member 34 is adhesive, and the back surface portion 80 is bonded to the back surface of the reinforcing member 32 and thereby attached to the back surface of the reinforcing member 32. Note that the protection member 34 may not be adhesive, and the back surface portion 80 may be bonded to the reinforcing member 32 through an adhesive, for example.

The back surface portion 80 has a plate shape extending in the first direction and the second direction when the panel member 12 is drawn out. In the embodiment, the back surface portion 80 has a rectangular shape with the first direction as the short-side direction and the second direction as the long-side direction and has a plate shape with the third direction as the thickness direction, when the panel member 12 is drawn out. The back surface portion 80 overlaps with the image display region 47 as viewed from the third direction.

Note that the back surface portion 80 may have a rectangular shape with the first direction as the long-side direction and the second direction as the short-side direction or may have a square shape, other polygonal shapes, a circular shape, or an elliptical shape, when the panel member 12 is drawn out.

The back surface portion 80 protrudes forward with respect to the display panel 28 in the roll-up direction. The back surface portion 80 also protrudes forward with respect to the display panel 28 in the draw-out direction.

The first folded portion 82 is folded toward a front surface 48 from one end of the back surface portion 80 in an orthogonal direction orthogonal to the roll-up direction. The orthogonal direction is a direction coinciding with the first direction. The first folded portion 82 covers one end surface of the display panel 28, one end surface of the reinforcing member 32, and end surfaces of other members in the orthogonal direction. The first folded portion 82 includes a first front surface portion 86.

The first front surface portion 86 is arranged at one end of the front surface 48 in the orthogonal direction. The one end is a part outside the image display region 47 in the front surface 48. That is, the first front surface portion 86 is arranged at a part outside the image display region 47 in the front surface 48.

The first front surface portion 86 is attached to the front surface 48. In the embodiment, the protection member 34 is adhesive, and the first front surface portion 86 is bonded to the front surface 48 and thereby attached to the front surface 48 as described above. Note that the protection member 34 may not be adhesive, and the first front surface portion 86 may be bonded to the front surface 48 through an adhesive, for example.

The first front surface portion 86 is arranged along the roll-up direction. That is, the first front surface portion 86 extends along the roll-up direction as viewed from the third direction when the panel member 12 is drawn out.

The first front surface portion 86 is arranged from a front end to a back end of the front surface 48 in the roll-up direction. In the embodiment, the first front surface portion 86 is arranged from a position anterior to the front end of the front surface 48 to a position posterior to the back end of the front surface 48 in the roll-up direction. Note that the first front surface portion 86 may be arranged from a position posterior to the front end of the front surface 48 to a position anterior to the back end of the front surface 48 in the roll-up direction.

A dimension A of the first folded portion 82 is smaller than a dimension B of the back surface portion 80 in the roll-up direction. That is, the dimension of the first front surface portion 86 is smaller than the dimension B of the back surface portion 80 in the roll-up direction.

Note that the dimension B of the back surface portion 80 may be smaller than the dimension A of the first folded portion 82 in the roll-up direction, for example.

The second folded portion 84 is folded toward the front surface 48 from another end of the back surface portion 80 in the orthogonal direction. The second folded portion 84 covers another end surface of the display panel 28, another end surface of the reinforcing member 32, and other end surfaces of other members in the orthogonal direction. The second folded portion 84 includes a second front surface portion 88.

The second front surface portion 88 is arranged at another end of the front surface 48 in the orthogonal direction. The other end is a part outside the image display region 47 in the front surface 48. That is, the second front surface portion 88 is arranged at a part outside the image display region 47 in the front surface 48.

The second front surface portion 88 is attached to the front surface 48. In the embodiment, the protection member 34 is adhesive, and the second front surface portion 88 is bonded to the front surface 48 and thereby attached to the front surface 48 as described above. Note that the protection member 34 may not be adhesive, and the second front surface portion 88 may be bonded to the front surface 48 through an adhesive, for example.

The second front surface portion 88 is arranged along the roll-up direction. That is, the second front surface portion 88 extends in the roll-up direction as viewed from the third direction when the panel member 12 is drawn out.

The second front surface portion 88 is arranged from the front end to the back end of the front surface 48 in the roll-up direction. In the embodiment, the second front surface portion 88 is arranged from a position anterior to the front end of the front surface 48 to a position posterior to the back end of the front surface 48 in the roll-up direction. Note that the second front surface portion 88 may be arranged from a position posterior to the front end of the front surface 48 to a position anterior to the back end of the front surface 48 in the roll-up direction, for example.

A dimension C of the second folded portion 84 is smaller than the dimension B of the back surface portion 80 in the roll-up direction. That is, the dimension of the second front surface portion 88 is smaller than the dimension B of the back surface portion 80 in the roll-up direction.

Note that the dimension B of the back surface portion 80 may be smaller than the dimension C of the second folded portion 84 in the roll-up direction, for example.

A foam material, a film material, or a cloth material is used to form the protection member 34, for example. Examples of the foam material include urethane foam, acrylic foam, and silicone foam. The film material is formed from, for example, polyethylene terephthalate (PET), polyimide (PI), or thermoplastic polyurethane (TPU). The cloth material is formed from, for example, nylon 66 or Kevlar.

The drive board 14 is a board that drives the display panel 28, and the drive board 14 is electrically connected to the display panel 28 through the flexible board 16. The drive board 14 includes a circuit that drives the display panel 28. The drive board 14 is provided in front of the display panel 28 in the roll-up direction and fixed to a main body 50 of the core member 18 inside the main body 50. The drive board 14 is, for example, a printed circuit board (PCB).

The flexible board 16 is a board that electrically connects the display panel 28 and the drive board 14, and the flexible board 16 is flexible. The flexible board 16 is connected to the display panel 28 and the drive board 14, and the flexible board 16 couples the display panel 28 and the drive board 14. That is, the flexible board 16 links the display panel 28 and the drive board 14 through the flexible board 16 to prevent the display panel 28 and the drive board 14 from being separated from each other.

The flexible board 16 is connected to a front end of the OLED panel 44 in the roll-up direction, and the flexible board 16 protrudes forward in the roll-up direction with respect to the OLED panel 44. A front end of the flexible board 16 in the roll-up direction is connected to the drive board 14. Note that the flexible board 16 may not be directly connected to the display panel 28 and the drive board 14, and for example, the flexible board 16 may be indirectly connected to the display panel 28 and the drive board 14 through another member. The flexible board 16 is, for example, a chip on film (COF).

The core member 18 is a roller that rolls up the panel member 12, and the drive board 14 and the panel member 12 are fixed to the core member 18. Specifically, the core member 18 is a member around which the panel member 12 is rolled when being rolled up. The core member 18 includes the main body 50 and a through portion 52.

The main body 50 has a substantially cylindrical shape with the first direction as the axial direction, and a front end of the panel member 12 in the roll-up direction is fixed to a peripheral surface of the main body 50. In the embodiment, the front end of the reinforcing member 32 in the roll-up direction is fixed to the peripheral surface of the main body 50. The through portion 52 penetrates the main body 50 in the radial direction of the main body 50 and extends in the axial direction of the main body 50. The flexible board 16 is inserted into the through portion 52.

The pantograph portion 20 includes the first attachment member 54, a second attachment member 56, a first arm member 58, and a second arm member 60.

The first attachment member 54 is attached to the front end of the panel member 12 in the draw-out direction. In the embodiment, as the first attachment member 54 sandwiches the front end of the reinforcing member 32 and a front end of the protection member 34 in the draw-out direction, the first attachment member 54 is attached to the front end of the panel member 12 in the draw-out direction. The first attachment member 54 extends in the first direction along the front end of the panel member 12 in the draw-out direction.

The second attachment member 56 faces the first attachment member 54 in the second direction and extends in the first direction. The second attachment member 56 is fixed to a member (not illustrated) that supports the core member 18 in a manner that the core member 18 can be rotated.

The first arm member 58 is provided closer to the back surface 46 of the display panel 28, and the first arm member 58 expands and contracts in the second direction. The first arm member 58 includes a plurality of link members 62 and 64. Each of the plurality of link members 62 and 64 pivots on the back surface 46 side of the display panel 28 to push out the first attachment member 54 in the draw-out direction.

The link member 62 has an elongated shape, and one end of the link member 62 is attached to the first attachment member 54 and is pivotable in the third direction. Another end of the link member 62 is attached to the link member 64 and is pivotable in the third direction.

The link member 64 has an elongated shape, and one end of the link member 64 is attached to the link member 62 and is pivotable in the third direction. Another end of the link member 64 is attached to the second attachment member 56 and is pivotable in the third direction.

The link member 64 is biased, for example, in a direction of clockwise rotation as viewed from the other side in the third direction (negative side in Z-axis direction). As the link member 64 pivots, the link member 62 pivots in the direction opposite the link member 64, and the first arm member 58 extends in the draw-out direction.

The second arm member 60 is provided closer to the back surface 46 of the display panel 28, and the second arm member 60 expands and contracts in the second direction. The second arm member 60 is provided on one side of the first arm member 58 in the first direction and is provided symmetrically to the first arm member 58. The second arm member 60 includes a plurality of link members 70 and 72. Each of the plurality of link members 70 and 72 pivots on the back surface 46 side of the display panel 28 to push out the first attachment member 54 in the draw-out direction.

The link member 70 has an elongated shape, and one end of the link member 70 is attached to the first attachment member 54 and is pivotable in the third direction. Another end of the link member 70 is attached to the link member 72 and is pivotable in the third direction.

The link member 72 has an elongated shape, and one end of the link member 72 is attached to the link member 70 and is pivotable in the third direction. Another end of the link member 72 is attached to the second attachment member 56 and is pivotable in the third direction.

The link member 72 is biased, for example, in a direction of counterclockwise rotation as viewed from the other side in the third direction. As the link member 72 pivots, the link member 70 pivots in the direction opposite the link member 72, and the second arm member 60 extends in the draw-out direction.

As each of the first arm member 58 and the second arm member 60 extends, the first attachment member 54 and the second attachment member 56 move in directions that separate them from each other, and the rolled panel member 12 is drawn out.

The motor 22 rotates the core member 18. When the motor 22 is rotated in one direction, the core member 18 rotates in one direction about an axis O, and the first arm member 58 and the second arm member 60 expand in the second direction. The first attachment member 54 moves in a direction that separates from the second attachment member 56, and the panel member 12 is drawn out from the core member 18. When the motor 22 is rotated in the other direction, the core member 18 rotates in the other direction about the axis O, and the first arm member 58 and the second arm member 60 contract in the second direction. The first attachment member 54 moves in a direction toward the second attachment member 56, and the panel member 12 is rolled up.

FIG. 5 is a schematic cross-sectional view illustrating a state in which the panel member 12 of the display apparatus 10 illustrated in FIG. 1A is rolled up. FIG. 5 illustrates a cross section parallel to the first direction and the third direction.

As illustrated in FIG. 5, the first folded portion 82 and the second folded portion 84 are arranged between the front surface 48 and the protection member 34 layered above the front surface 48, when the panel member 12 is rolled up. As a result, a space is formed between the center of the front surface 48 in the orthogonal direction and the protection member 34 layered above the front surface 48. This can prevent the center of the front surface 48 in the orthogonal direction from coming into contact with the protection member 34 and other components when the panel member 12 is rolled up, thus preventing the display panel 28 from being damaged.

This completes the description of the display apparatus 10.

The display apparatus 10 according to the first embodiment includes the display panel 28 that is capable of being rolled up, and the protection member 34, the protection member 34 including the back surface portion 80 layered closer to the back surface 46 of the display panel 28, the first folded portion 82 folded toward the front surface 48 of the display panel 28 from the one end of the back surface portion 80 in the orthogonal direction orthogonal to the roll-up direction in which the display panel 28 is rolled up, and the second folded portion 84 folded toward the front surface 48 from the other end of the back surface portion 80 in the orthogonal direction. In the display apparatus 10, the first folded portion 82 includes the first front surface portion 86 arranged at the one end of the front surface 48 in the orthogonal direction, and the second folded portion 84 includes the second front surface portion 88 arranged on the other end of the front surface 48 in the orthogonal direction.

According to this, the first front surface portion 86 and the second front surface portion 88 can prevent the front surface 48 of the display panel 28 from coming into contact with other members, such as the back surface portion 80, when the display panel 28 is rolled up, thus preventing the display panel 28 from being damaged.

In the display apparatus 10 according to the first embodiment, each of the first front surface portion 86 and the second front surface portion 88 is arranged along the roll-up direction.

According to this, the first front surface portion 86 and the second front surface portion 88 can further prevent the front surface 48 of the display panel 28 from coming into contact with other members, such as the back surface portion 80, when the display panel 28 is rolled up, thus further preventing the display panel 28 from being damaged.

In the display apparatus 10 according to the first embodiment, each of the first front surface portion 86 and the second front surface portion 88 is arranged from the front end to the back end of the front surface 48 in the roll-up direction.

This can prevent the front surface 48 from coming into contact with other members, such as the back surface portion 80, from the front end to the back end of the front surface 48 in the roll-up direction when the display panel 28 is rolled up, thus further preventing the display panel 28 from being damaged.

In the display apparatus 10 according to the first embodiment, each of the dimension A of the first folded portion 82 and the dimension C of the second folded portion 84 is smaller than the dimension B of the back surface portion 80 in the roll-up direction.

This can prevent reduction in size of the part of connection between the first folded portion 82 and the back surface portion 80 and prevent the first folded portion 82 from being separated from the back surface portion 80. This can also prevent reduction in size of the part of connection between the second folded portion 84 and the back surface portion 80 and prevent the second folded portion 84 from being separated from the back surface portion 80.

The display apparatus 10 according to the first embodiment further includes the reinforcing member 32 with the rigidity higher than the rigidity of the display panel 28, the reinforcing member 32 being arranged between the display panel 28 and the back surface portion 80.

According to this, when the display panel 28 is drawn out, the flatness of the display panel 28 can easily be maintained without the display panel 28 being strongly pulled in the draw-out direction, and this can prevent damage of the display panel 28 caused by strongly pulling the display panel 28 in the draw-out direction.

In the display apparatus 10 according to the first embodiment, a foam material, a film material, or a cloth material is used to form the protection member 34.

This can prevent the display panel 28 from becoming difficult to roll up and can prevent damage of the display panel 28.

Second Embodiment

FIG. 6A and FIG. 6B depict a cross section of a display apparatus 10a and a panel member 12a according to a second embodiment. FIG. 6A illustrates the cross section of the display apparatus 10a, and FIG. 6B illustrates the panel member 12a.

As illustrated in FIG. 6A and FIG. 6B, the display apparatus 10a is mainly different from the display apparatus 10 in that the display apparatus 10a includes the panel member 12a different from the panel member 12. The panel member 12a is mainly different from the panel member 12 in that the panel member 12a includes a protection member 34a different from the protection member 34. The protection member 34a is mainly different from the protection member 34 in that the protection member 34a includes a first folded portion 82a different from the first folded portion 82 and a second folded portion 84a different from the second folded portion 84.

The first folded portion 82a includes a plurality of first front surface portions 86a lined up in the roll-up direction. Each of the plurality of first front surface portions 86a is arranged on the one end of the front surface 48 in the orthogonal direction. Each of the plurality of first front surface portions 86a is spaced apart from adjacent first front surface portions 86a of the plurality of first front surface portions 86a.

The second folded portion 84a includes a plurality of second front surface portions 88a lined up in the roll-up direction. Each of the plurality of second front surface portions 88a is arranged on the other end of the front surface 48 in the orthogonal direction. Each of the plurality of second front surface portions 88a is spaced apart from adjacent second front surface portions 88a of the plurality of second front surface portions 88a.

This completes the description of the display apparatus 10a.

In the display apparatus 10a according to the second embodiment, the first folded portion 82a includes the plurality of first front surface portions 86a lined up in the roll-up direction, and the second folded portion 84a includes the plurality of second front surface portions 88a lined up in the roll-up direction.

This can prevent each of the first folded portion 82a and the second folded portion 84a from becoming difficult to curl up in rolling up the display panel 28. This can prevent the display panel 28 from becoming difficult to roll up while also preventing the display panel 28 from being damaged.

Other Embodiments, Etc

Although the display apparatus according to embodiments of the present disclosure has been described, the present disclosure is not limited to the embodiments. Modifications obtained by modifying the embodiments in various ways conceived of by those skilled in the art without departing from the scope of the present disclosure and various devices including the display panel according to an embodiment of the present disclosure are also included in the present disclosure.

Although the display apparatus 10 includes the reinforcing member 32 in the cases described in the embodiments, the configuration is not limited to this. For example, the display apparatus may not include the reinforcing member.

The display apparatus according to the present disclosure can be used for a digital television, digital signage, a smartphone, a tablet terminal, a wearable terminal, and other equipment.

What is claimed is:

1. A display apparatus comprising:
a display panel that is capable of being rolled up; and
a protection member including a back surface portion layered closer to a back surface of the display panel, a first folded portion folded toward a front surface of the display panel from one end of the back surface portion in an orthogonal direction orthogonal to a roll-up direction in which the display panel is rolled up, and a second folded portion folded toward the front surface from another end of the back surface portion in the orthogonal direction, wherein
the first folded portion includes a first front surface portion arranged at one end of the front surface in the orthogonal direction,
the second folded portion includes a second front surface portion arranged at another end of the front surface in the orthogonal direction, and
the protection member is made of at least one of a foam material or a cloth material.

2. The display apparatus according to claim 1, wherein each of the first front surface portion and the second front surface portion is arranged along the roll-up direction.

3. The display apparatus according to claim 2, wherein each of the first front surface portion and the second front surface portion is arranged from a front end to a back end of the front surface in the roll-up direction.

4. The display apparatus according to claim 1, wherein the first folded portion includes a plurality of the first front surface portions lined up in the roll-up direction, and
the second folded portion includes a plurality of the second front surface portions lined up in the roll-up direction.

5. The display apparatus according to claim 1, wherein each of a dimension of the first folded portion and a dimension of the second folded portion is smaller than a dimension of the back surface portion in the roll-up direction.

6. The display apparatus according to claim 1, further comprising:
a reinforcing member with rigidity higher than rigidity of the display panel, the reinforcing member being arranged between the display panel and the back surface portion.

7. The display apparatus according to claim 1, wherein the protection member is further made of a film material.

* * * * *